Jan. 8, 1952 P. F. TUERK 2,581,985
DETACHABLE LEAK-PROOF TRUCK CANVAS CONNECTOR
Filed July 25, 1950
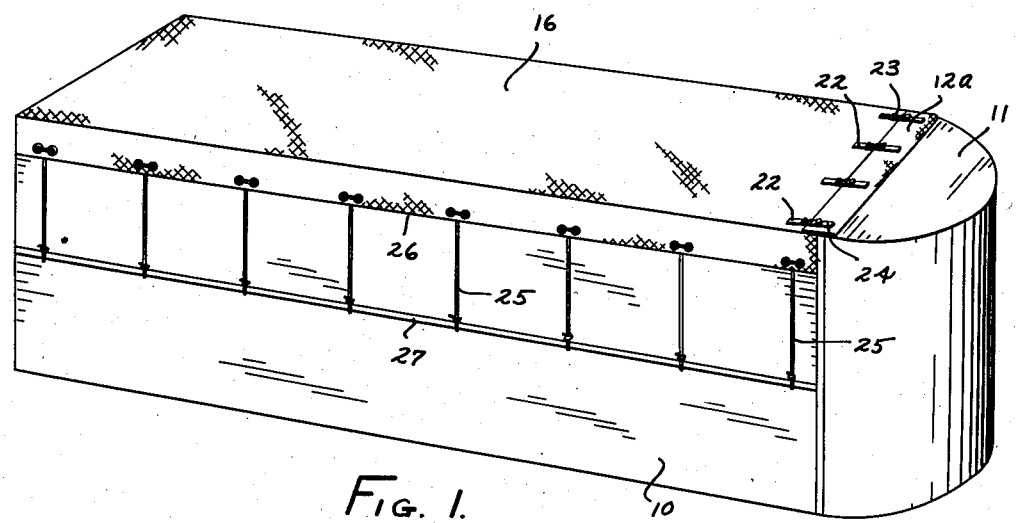
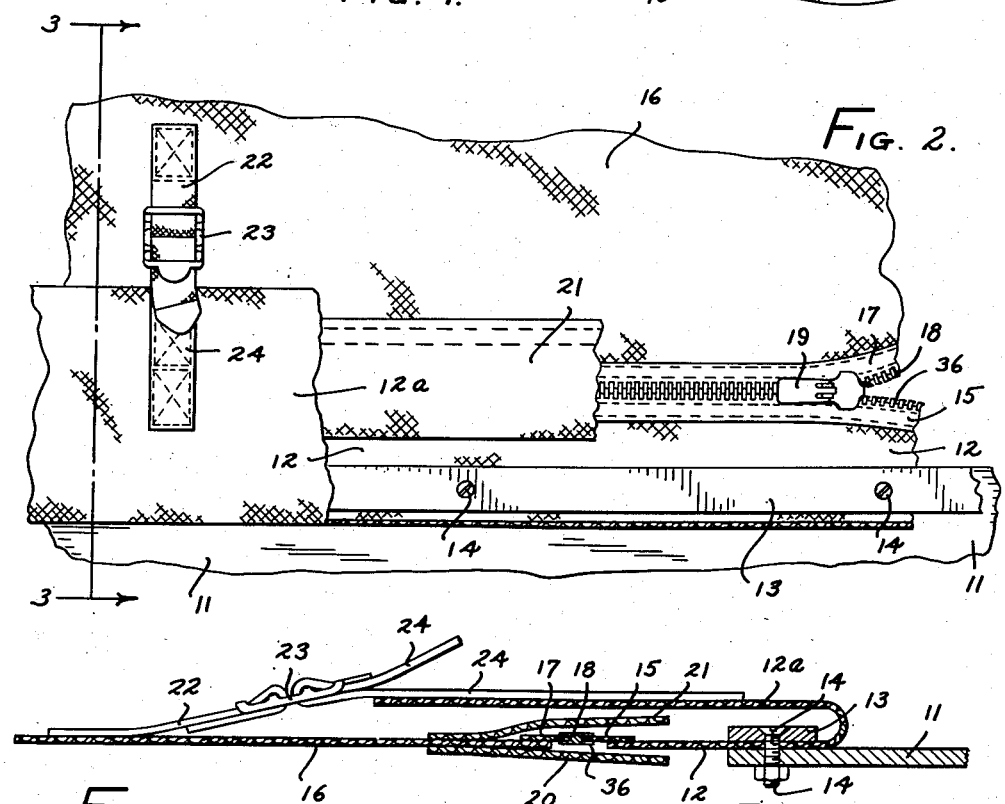
INVENTOR,
PAUL F. TUERK,
By Herbert Q. Minturn,
ATTORNEY.

Patented Jan. 8, 1952

2,581,985

UNITED STATES PATENT OFFICE 2,581,985

DETACHABLE LEAKPROOF TRUCK CANVAS CONNECTOR

Paul F. Tuerk, Indianapolis, Ind.

Application July 25, 1950, Serial No. 175,772

2 Claims. (Cl. 296—100)

This invention relates to an attaching mechanism for the forward end of a tarpaulin or a canvas such as is customarily used over a truck having an open top and with side walls. In many instances a truck or a trailer is constructed to have side walls but with no top so that the load may be loaded and unloaded without being restricted by an overhead top. In many cases however it is desirable that the load be covered to protect it not only from the sun, but also from the rain, and from road splashing and dust.

Due to the relatively high speed of the vehicle, it is necessary that the forward end of the cover be securely held down to prevent wind from whipping under it and causing it to blow off or tear. Also it is necessary that this forward end be held in engagement with the front end of the trailer or truck so that rain will not be forced under it due to the velocity of the vehicle.

It is a primary object of this invention to provide a quick detachable connection between the cover and a rigid member across the upper front end of the vehicle. Furthermore it is also an object of the invention to make a watertight connection between the rigid member and the cover.

These and many other objects and advantages of the invention are accomplished broadly by providing a fixed portion of a slide connection to the rigid member of the vehicle, using the other portion of the slide connection on the cover, so that the two portions may be interconnected in the usual manner by a slide fastener, and then over that slide connection and below it, are provided flaps directed forwardly, this assembly being over-lapped by another canvas portion which also serves as means for attaching members to take the stress of the pull of the cover itself.

Referring to the accompanying drawing, in which:

Fig. 1 is a view in perspective of a vehicle to which the invention is applied;

Fig. 2 is a fragmentary top plan view in partial section of the connection structure; and Fig. 3 is a view in vertical section on the line 3—3 in Fig. 2.

Transversely arranged to cross the upper front end portion of the vehicle, herein shown as a truck trailer body 10, there is provided a rigid plate 11 to form a base for mounting the structure comprising the invention. A length of flexible fabric 12, such as canvas, is secured to the top side of the plate 11 by means of a cross bar 13 laid thereover and bolted down through the canvas 12 and the plate 11 by means of bolts 14 spaced at intervals therealong.

A short length of this canvas 12 extends rearwardly from the plate 11 in an overhanging relation. Across the rear edge of this canvas 12 is secured a tape 15 carrying the usual slide fastener teeth 36 therealong. The canvas 12 extends forwardly from between the plate 11 and the bar 13 by a length 12a which is normally folded around over the bar 13 to extend rearwardly therefrom. However in attaching the cover 16, this portion 12a, hereinafter termed a cover flap is folded forwardly on the plate 11 to be out of the way temporarily.

Across the front end of the cover 16, this cover also being made out of a flexible material such as canvas, there is secured thereto a tape 17 also carrying teeth 18 to interengage with the teeth 36. A slide 19 is provided in the usual manner to interengage the teeth 18 and 36.

Also secured to the forward end portion of the cover 16, transversely thereacross, Fig. 3, is an under shield 20 and a top shield 21, both made out of flexible material such as canvas, and stitched across the cover 16, the shield 20 being under the cover, and the shield 21 being on top of the cover. The two shields 20 and 21 are secured to the cover 16 rearwardly of the tape 17. The forward length of these shields 20 and 21 are sufficient to overlap the tapes 17 and 15 and extend slightly forwardly thereof so that the slide fastening mechanism is amply protected from both the underside and the top side.

Also secured to the cover 16 is a plurality of buckle straps 22, herein shown as four in number, this number varying as may be desired, depending upon the width of the cover 16, and the space between the side walls of the truck or trailer body 10. These straps 22 are secured to the cover rearwardly of the shields 20 and 21 a sufficient distance so that the buckles 23 carried thereby may be entirely out of the way when the top shield 21 at least is folded back to permit access to the slide 19.

Along the cover flap 12a, in spaced relation equal to the spacing apart of the straps 22, there are secured thereto straps 24 which are long enough to be carried through the buckles 23 in order to pull the cover flap 12a rearwardly sufficiently to take the strain of the pull of the cover 16 through the buckles 23, and the straps 22 in order to relieve the teeth 18 and 36 from carrying any appreciable portion of that pull of the cover.

In tightening up the straps 24 it is to be seen that the cover flap 12a, shown loosely in Fig. 3, will be pulled down snugly to compress the top shield 21 against the top side of the tapes 17 and 15, and the intervening slide connections, all with the effect that there is a waterproof cover provided since the water cannot be driven under the canvas 12 by reason of the compression thereof against the plate 11 through the bar 13. Water striking the canvas 12 ahead of the bar 13 will be carried on over the top of the canvas cover flap 12a to discharge rearwardly of the shield 21. The forward length of the under shield 20 is held to a minimum but still remains sufficient to bridge across the underside of the slide connection, and in any event is normally sufficiently stiff to remain substantially horizontally disposed so as to protect the underside of the slide fastener from coming into contact with any portion of the load thereunder, and in reverse, preventing the load from injuring that connection.

Normally the cover 16 will be held down along the sides of the body 10 such as is suggested in Fig. 1, wherein the tie ropes 25, engaged by their top ends to the side marginal edge 26 of the cover 16 are carried downwardly to a rail 27 mounted along the side wall of the truck or trailer 10. In any event, the cover 16 is thus held down, primarily at its forward end, so that wind cannot enter thereunder, and cause the cover 16 to whip and allow water to enter thereunder.

While I have herein shown and described my invention in the one particular form, it is obvious that structural changes may be employed without departing from the spirit of the invention, and I therefore do not desire to be limited to that precise form beyond the limitations which may be imposed by the following claims.

I claim:

1. A forward end detachable, flexible cover connection for a vehicle having a substantially rigid transverse member at its front upper end, comprising a length of flexible fabric; a bar extending across an intermediate portion of the fabric; means compressibly interengaging the bar through the fabric with said rigid member to form a water tight connection therewith; a slide fastener tooth carrying tape secured across the rear end of said fabric; a complementary slide fastener tooth carrying tape secured across the forward end of said cover; a slide for interengaging the teeth of said tapes; an under shield fixed to said cover to extend forwardly under said tapes, terminating by a free transverse edge; an upper shield fixed to said cover to extend forwardly over said tapes and terminate by a free transverse end; a plurality of straps fixed in transversely spaced relation across the cover back of said shields to extend forwardly from the top side of the cover; the portion of said flexible fabric extending forwardly of said bar having a length permitting it to be folded rearwardly over said upper shield; a plurality of straps fixed in transversely spaced relation across said fabric length, to align with said cover straps; and means for interengaging the cover and fabric length straps to take the strain of the cover backward pull through the straps to relieve pull on said fastener teeth.

2. A vehicle front end cover holder comprising a fabric secured to the vehicle to have a rearwardly extending portion and a folded over portion directed rearwardly over and beyond the rearwardly extending portion; a slide fastener tooth carrying tape fixed on the rearwardly extending portion; a complementary slide fastener tooth carrying tape fixed across the forward end portion of the cover; a slide for interengaging the teeth of said tapes; straps secured to said cover behind its tape; straps secured to said folded over fabric portion aligned with the cover straps; and buckles interengaging each set of straps to transmit rearward pull of the cover to said folded over portions.

PAUL F. TUERK.

REFERENCES CITED

The following references are of record in the file of this patent:

UNITED STATES PATENTS

| Number | Name | Date |
|---|---|---|
| 2,418,918 | Yankus | Apr. 15, 1947 |
| 2,479,280 | Tuerk | Aug. 16, 1949 |